United States Patent
Johnson

(10) Patent No.: US 8,350,522 B2
(45) Date of Patent: Jan. 8, 2013

(54) EXTERNAL POWER SOURCE VOLTAGE DROP COMPENSATION FOR PORTABLE DEVICES

(75) Inventor: Timothy M. Johnson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 424 days.

(21) Appl. No.: 12/721,223

(22) Filed: Mar. 10, 2010

(65) Prior Publication Data
US 2011/0221604 A1    Sep. 15, 2011

(51) Int. Cl.
*H01M 10/44*    (2006.01)
*H01M 10/46*    (2006.01)
(52) U.S. Cl. ........................................ 320/107
(58) Field of Classification Search ................ 320/107, 320/112, 114, 127, 128, 137
See application file for complete search history.

(56) References Cited

U.S. PATENT DOCUMENTS

| | | | |
|---|---|---|---|
| 5,352,968 A | 10/1994 | Reni et al. | |
| 5,532,524 A | 7/1996 | Townsley et al. | |
| 5,783,927 A * | 7/1998 | Chen | 320/110 |
| 5,841,996 A * | 11/1998 | Nolan et al. | 710/305 |
| 5,925,942 A | 7/1999 | Theobald | |
| 6,201,370 B1 * | 3/2001 | Reller et al. | 320/107 |
| 6,300,743 B1 | 10/2001 | Patino et al. | |
| 6,681,278 B1 | 1/2004 | Jakl | |
| 7,421,594 B2 | 9/2008 | Nakajima et al. | |
| 7,421,604 B1 | 9/2008 | Mimberg | |
| 2004/0164707 A1 | 8/2004 | Veselic et al. | |
| 2005/0174094 A1 | 8/2005 | Purdy et al. | |
| 2006/0015757 A1 | 1/2006 | Tupman et al. | |
| 2006/0181241 A1 | 8/2006 | Veselic | |
| 2007/0046268 A1 | 3/2007 | Irie | |
| 2007/0108938 A1 | 5/2007 | Veselic | |
| 2008/0259654 A1 | 10/2008 | Huynh et al. | |
| 2008/0278132 A1 | 11/2008 | Kesterson et al. | |
| 2009/0102429 A1 | 4/2009 | Xu et al. | |
| 2009/0189569 A1 | 7/2009 | Hsu et al. | |
| 2009/0261786 A1 | 10/2009 | Hsu et al. | |
| 2009/0278407 A1 | 11/2009 | Tupman et al. | |
| 2009/0289604 A1 | 11/2009 | Carkner | |

FOREIGN PATENT DOCUMENTS

| | | |
|---|---|---|
| EP | 1 198 049 A1 | 4/2002 |
| WO | WO-2004075039 A1 | 9/2004 |

OTHER PUBLICATIONS

PCT Invitation to Pay Additional Fees and, Where Applicable, Protest Fee, for PCT/US2011/026461, mailed May 16, 2012.
PCT International Search Report and Written Opinion (dated Sep. 20, 2012), International Application No. PCT/US2011/026461, International Filing Date—Feb. 28, 2012, 21 pages.

* cited by examiner

*Primary Examiner* — Edward Tso
(74) *Attorney, Agent, or Firm* — Blakely, Sokoloff, Taylor & Zafman LLP

(57) ABSTRACT

A portable electronic device has a connector with a first pin and a second pin, and a battery charging circuit having an input coupled to receive current through the second pin to charge a battery of the device. The portable device also has a controller to determine whether the connector is coupled to an external power source (EPS) having a power converter circuit that can provide the current. The controller on that basis drives the first pin to stimulate the power converter circuit to raise voltage on the second pin. Other embodiments are also described and claimed.

34 Claims, 7 Drawing Sheets

EXTERNAL POWER SOURCE VOLTAGE DROP COMPENSATION FOR PORTABLE DEVICES

FIELD

An embodiment of the invention relates to portable devices, such as smart phones, and techniques for powering the portable device using an external power source, such as a Universal Serial Bus (USB) power adapter. Other embodiments are also described.

BACKGROUND

A portable device ("PD"), such as a smart phone, a laptop or notebook computer, and a cellular handset (just to name a few) is of course battery operated and therefore needs to be coupled to an external power source ("EPS") to charge the battery. Typically, a PD has a battery charging circuit that draws current from a power pin (power line) of a communications interface connector of the device. For example, the current needed to charge the battery may be drawn from the Vbus pin of a Universal Serial Bus (USB) connector, while the latter is connected to a USB power adapter or to a desktop personal computer's high power USB port. The USB connector also has a data pin (data line), more specifically a pair of differentially driven data lines, used to primarily transfer data, rather than power, between the PD at one end and another computing device that is connected to the other end of a USB cable.

As PDs evolve with greater power consumption and larger battery capacity, the amount of current drawn from the EPS while charging the battery rises, for instance to one ampere or more. In addition, industry recommended requirements for communications interfaces (that also are power conduits) place an upper limit on the dc voltage of the power line that is close to the battery voltage. For example, a Vbus specification of 5 Volts dc at the output port of the USB power adapter circuit is close to the cell voltage of a fully charged lithium polymer cell, namely about 4.2 Volts.

SUMMARY

A battery charging circuit of a PD needs sufficient "headroom", i.e. voltage between its output and input ports, to operate properly and thereby fully charge the battery. This headroom however is expected to shrink, as PDs demand more current to charge their larger batteries more quickly, due to the voltage drop I*R on the dc path of the power line of the communications interface (between the EPS and the input port of the battery charging circuit). This voltage drop, which is due to the "R" having contributions from cable resistance and printed circuit board components such as overvoltage/undervoltage switches, flexible wire circuits, and ferrites, may leave insufficient headroom for the battery charging circuit at high current ("I").

An embodiment of the invention is a technique that compensates for the power line voltage drop in a communications interface between a power converter circuit of an EPS and the battery charging circuit of a PD. In one instance, the technique helps maintain sufficient headroom for the battery charging circuit, while remaining within the bounds of the USB specification for Vbus on the power line. The technique may also be applicable to other communications interfaces used by PDs. The technique may work to compensate for relatively long cables that can connect the EPS to the PD. Further, the technique may "decouple" the design of the interface so that less effort would be needed to reduce I*R drops, e.g. higher performing (lower Rds(on)) transistor switches may not be needed, multiple inductors in parallel may not be needed, thereby reducing the manufacture cost of the interface.

In one embodiment, the voltage drop compensation technique has two aspects. On the PD-side of the communications interface, a first controller is provided that determines whether a connector, which includes at least a first pin (e.g., data pin or data line) and a second pin (e.g., power pin or power line), is coupled to an EPS having a power converter circuit. The coupling may include a communications interface cable, e.g. a USB cable. The controller determines whether the power converter circuit can provide a certain amount of current (through the second pin) to a battery charging circuit in the PD. On that basis, the controller drives the first pin of the connector, so as to stimulate the power converter circuit to raise its output voltage. This results in the voltage on the second pin of the connector rising, and thereby compensating for the voltage drop on the power line.

On the EPS-side of the communications interface, a second controller (in the coupled EPS) responds to the driven first pin by changing a feedback input signal of a dc voltage regulator in the power converter circuit. This signal may be an input to an error amplifier of the voltage regulator, with the other input being a reference signal (representing the desired or regulated output voltage). The change in the feedback input signal causes the voltage regulator to raise its regulated, dc output voltage slightly, enough to compensate for (not necessarily fully) the voltage drop that is occurring in the communications interface. Several possibilities for the second controller to change the feedback input signal responsive to the data line, i.e. in response to actions taken on the data line by the first controller, are given here.

In one embodiment, the first controller (PD-side) determines whether its connector is coupled to the EPS, by checking for sufficient voltage on the power pin and then attempting a bus device enumeration process through the connector. If the attempt to enumerate fails, then this may be an indication that a particular type of EPS is present (e.g., an AC power adapter unit, a cigarette lighter adapter unit) which is suitable to provide a larger current (needed to more quickly charge the battery). Other techniques for making this determination can be used.

The first controller may also determine a current limit or maximum output current of the EPS. For instance, the first controller can decode an indication or signal on the data line, to recognize this current limit. The indication may be, for example, an analog code defined by a selected combination of one or more resistors that are coupled to the data line inside the EPS. Some EPSs would have greater current capability than others; this may be indicated by the analog codes present on their data lines. Alternatively, other techniques for indicating the current capability may be used (e.g., a digital code on the data line).

The first controller may be configured to recognize several different current limits, which may be those of different types of EPSs that can be coupled to the PD. Once the controller has determined that the EPS has a higher current limit (as compared to a lower one), it may signal this information to the battery charging circuit, which can then increase the current it draws from the power line (e.g., up to the higher limit). To compensate for the greater voltage drop caused by the increased current, the first controller may drive the data line so as to change the dc voltage of the data line. For example, as the voltage at the input of the battery charging circuit drops (due to increasing load on the power line) the voltage on the data line is actively raised in lock step, e.g. in a linear relationship, a one-to-one in relationship, or in a non-linear relationship. The changing dc voltage on the data line in turn adjusts the feedback input signal of the power converter to in a sense emulate a lower voltage at the output of the power converter, so that the closed loop voltage regulator function of the power converter responds by for example increasing its duty cycle to thereby raise its regulated, dc output voltage (in accordance with its normal feedback control loop process). Thus, the EPS compensates in a direct manner for the voltage drop that occurs through the communications interface.

In another embodiment, the first controller drives the data line by signaling a predetermined code, or in essence a control signal, on the data line, where this code indicates that the battery charging circuit is drawing a higher current level. On the EPS side, the second controller recognizes or decodes this predetermined code, and then changes the feedback input signal of the voltage regulator function in accordance with the decoded code (to compensate for the voltage drop in the communications interface).

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the associated claims. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
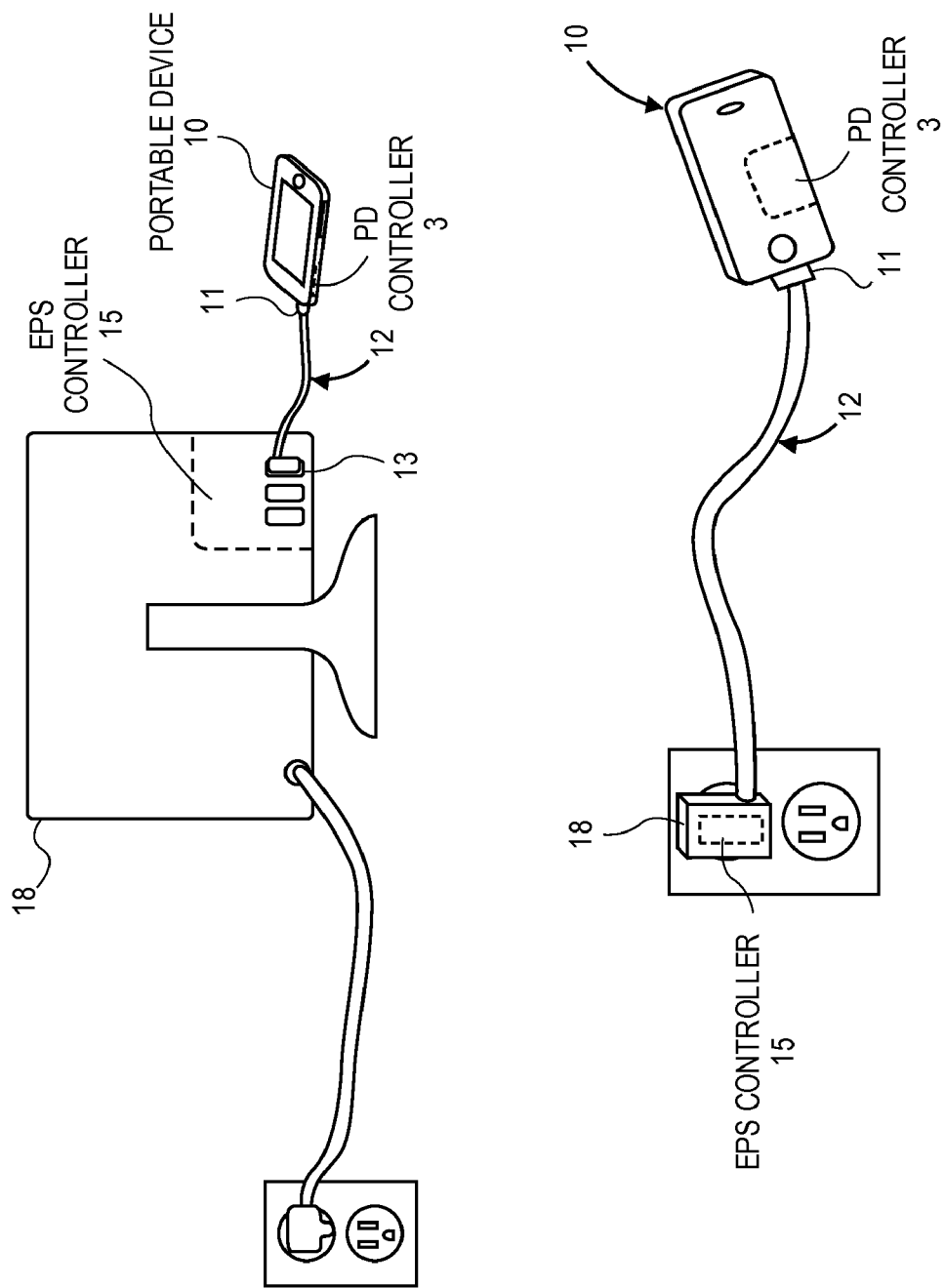
FIG. 1 illustrates different scenarios of a PD coupled to an EPS.

FIG. 1 illustrates different scenarios of a PD 10 that is coupled to an EPS 18, for purposes of charging a battery (not shown) of the PD 10. Two instances are shown, where in one instance the PD 10 is coupled to a desktop personal computer through a communications interface cable assembly 12. The desktop computer may be powered by being plugged into an AC wall outlet, as shown. In another instance, the PD 10 is coupled to the EPS 18 being an AC wall power adapter unit. In yet another instance (not shown), the EPS 18 may be a cigarette lighter adapter unit.

In one instance, the cable assembly 12 has a PD-side cable connector 11 that is designed to mate with a built-in connector of the PD 10 (not shown), in addition to an EPS-side cable connector 13. The latter would be pluggable with a mating connector built into the EPS 18. The cable assembly 12 may, for example, be in accordance with a computer peripheral communications interface specification, such as Universal Serial Bus (USB) or other suitable communications interface. The communications interface may also be referred to as a communications bus. Note that in another instance, the cable assembly 12, while having the PD-side connector 11, has no corresponding EPS-side connector 13. In that case, the wires of the cable assembly 12 may be hardwired into circuitry inside a housing of the EPS 18.

Figure 2:
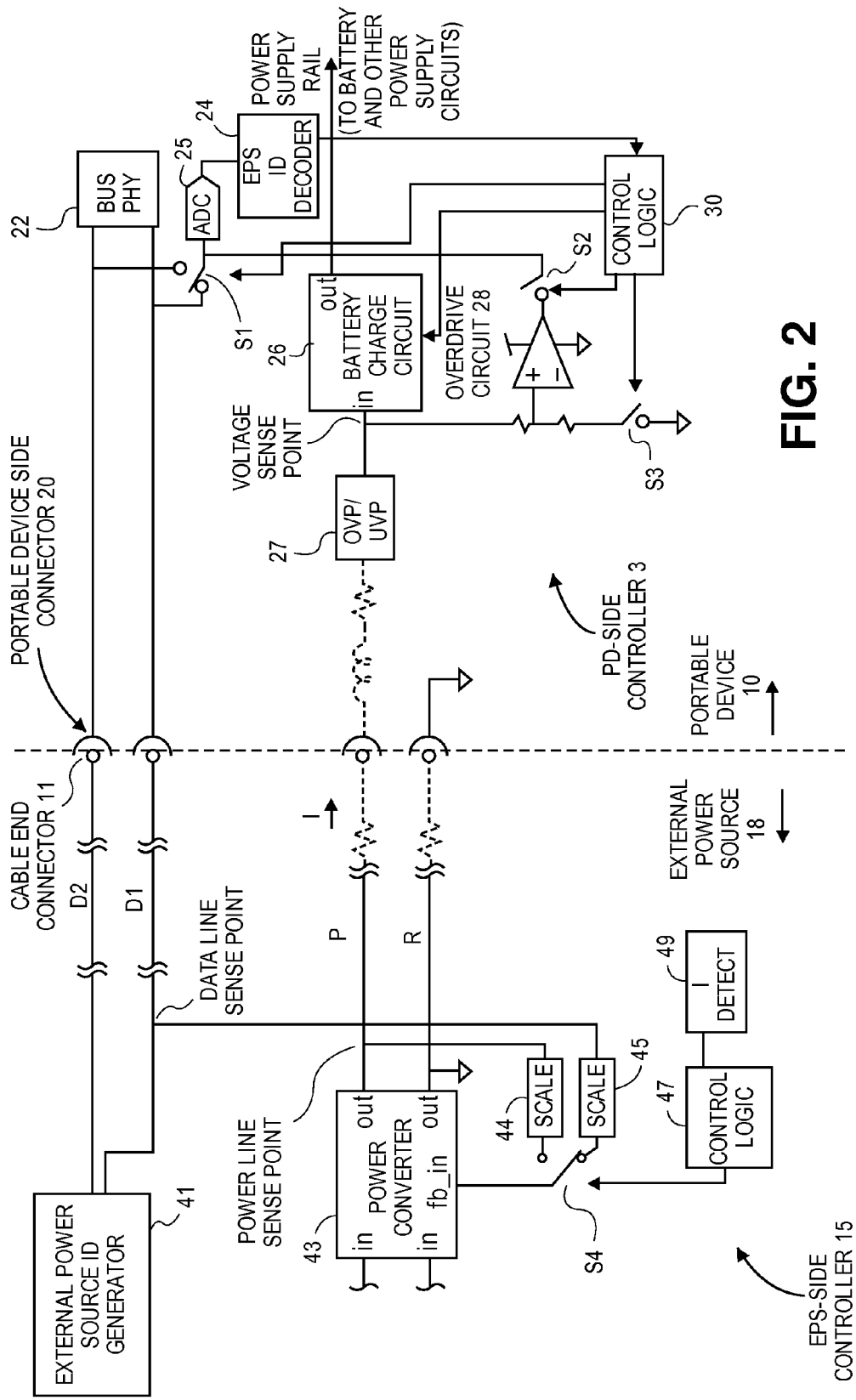
FIG. 2 is a circuit schematic of controller circuitry in the EPS and in the PD that achieve voltage drop compensation, in accordance with an embodiment of the invention.

Turning now to FIG. 2, a circuit schematic of EPS-side and PD-side controller circuitry that achieve voltage drop compensation, in accordance with an embodiment of the invention is shown. The EPS 18 contains an EPS-side controller 15 that interacts with a PD-side controller 3 located in the PD 10. Beginning with the PD 10, a PD-side connector 20, which, as suggested above, may be a communications interface connector such as a USB connector or other computer peripheral bus connector, has at least one data line or data pin, D1, a power line or power pin, P, and a return/reference pin, R. While the one or more data lines are primarily used for data communications with an external device, the power line is primarily used for delivering power from the EPS 18. Note that in this example, there are two data lines D1 and D2, serving primarily the role of a serial, differential communications link. The connector 20 in this case has four electrical contacts or pins, a separate one for each of the data, power and return lines. These electrical contacts will mate with a mating connector that is at the end of the cable assembly 12, referred to as the PD-side connector 11, allowing communications with an external device over the data lines D1, D2. This is enabled by a bus phy circuit 22 that performs translations between the physical layer signaling on the data lines D1, D2 and higher layer functions of the PD 10 (not discussed here).

The PD 10 also includes a battery charging circuit 26 having an input coupled to receive current through the power line, P, of the connector 20, when coupled to the EPS 18. Between the connector 20 and input port of the battery charging circuit 26, the power line P exhibits parasitic resistors and inductors (e.g., due to flexible wiring circuits and ferrites). In this example, an overvoltage protection/undervoltage protection (OVP/UVP) switch circuit 27 is also present, contributing further to the voltage drop in the communications interface.

The battery charging circuit 26 may have several functions, at least one of which is to charge a battery (not shown) that serves as a portable power source of the PD 10, which is typically integrated within the PD 10 housing (not shown). The battery charging circuit 26 regulates the amount of current it feeds to the battery, drawn from the power line P through its input port, so as to efficiently charge the battery to its full state. This may occur at variable current levels, while monitoring battery voltage. In one instance, the battery charging circuit 26 is capable of properly charging a lithium polymer rechargeable cell having a nominal voltage of 3.7 volts and a fully charged voltage of about 4.2 volts. This, of course, is an example only as other types of battery chemistries and associated battery charging circuitry can be used instead.

In one embodiment, the PD device 10, and in particular all of its other power supplies (i.e., other than the ones that may be deemed part of the battery charging circuit 26 itself) may be powered directly from the battery terminals, when the EPS 18 is not present. In other words, the battery charging circuit 26 in this case acts like a diode between its in and out terminals: when the EPS 18 is present, the battery charging circuit 26 supplies power to not just the battery but also all other power supply circuits of the PD 10, on the same power supply rail as shown in FIG. 2; and when the EPS 18 is absent, the battery charging circuit 26 is essentially an open circuit so that power supply rail is fed directly by the battery.

The battery charging circuit 26 may have the additional function of acting as a programmable current limiter to the power line. For example, it could limit the max current on the P line to 1 A (pursuant to instructions from the control logic 30 and the EPS identification decoder 24), and distribute the 1 A as follows: about 0.8 A for charging the battery and the rest (about 0.2 A) for running the other power supplies of the PD 10. The control logic 30 may have the intelligence to allocate the max current drawn on the P line differently, depending on known power management algorithms.

The PD-side controller 3, just as the EPS-side controller 15 to be discussed below, may be implemented as a combination of analog and digital hardwired circuitry, and programmed data processing components that control the manner in which the voltage compensation process is conducted. The PD-side controller may be composed of the following functional unit blocks.

To determine whether the connector 20 is coupled to an EPS 18, the controller 3 has an analog to digital converter (ADC) 25 which digitizes the signals on the one or more data lines (the ADC is in this case switched between the data lines D1, D2 by a switch S1). An EPS identification decoder 24 is provided that evaluates the digitized values or codes on the data lines, to make the determination as to the type of EPS 18 that is coupled to the PD 10. The code may be generated by an EPS identification generator 41 (inside the EPS 18). For example, the EPS 18 may be identified as an AC wall adapter unit that conforms with the USB specification, capable of providing +5 volts dc on the power line P, at up to 1 ampere of current I. The EPS identification decoder 25 may have previously stored codes for several different types of EPS 18. It may recognize the coupled EPS 18 by comparing the code that it reads on the data lines D1, D2 to those previously stored codes. For various EPS identification techniques, see U.S. Patent Application Publication No. 2006/0015757 of Tupman, et al.

In one instance the codes may be generated (in the EPS 18) using pull-up and pull-down resistors on one or both of the data lines D1, D2, such that a range of different max or rated currents can be identified. For example, the following table can be programmed into the EPS identification decoder 24

| Current Capability | D1 | D2 |
|---|---|---|
| 100 mA | 5 Volts | 0 Volts |
| 500 mA | 2.5 Volts | 0 Volts |
| 1 A | 2.5 Volts | 2.5 Volts | where each data line in this example can have any one of three different states (here, zero (0)V, 2.5V, and 5V), allowing for up to nine different combinations of current capability to be recognized.

In identifying the EPS 18, the EPS identification decoder 24 may indicate the maximum current capacity of a power converter circuit 43 that is to deliver the current I. This information can be specified to the battery charging circuit 26, which in turn can increase its current draw on the power line P to the specified limit. Note that since there may be several different types of EPS 18 that can be coupled to the PD 10, where each type of EPS may have a different current limit, the EPS identification decoder 24 will enable the battery charging circuit 26 to adapt to the different current limits. Thus, the consumer or end user of the PD 10 can be assured that the battery will be charged at the fastest possible rate, regardless of the type of EPS 18 to which he has connected his PD 10.

It should be noted that references here to "maximum available current" or "current capacity" are used generically to also cover instances where the power converter circuit 43 of the EPS 18 is identified using its corresponding "maximum power" or "power capability".

The PD-side controller 3, and in particular its control logic 30, on the basis of having determined that the connector 20 is coupled to the EPS 18 and that the max current or available power from the EPS 18 is greater than a given threshold, may signal the battery charging circuit 26 that it may increase its current draw (e.g., to enable it to charge the battery faster). At that point, voltage drop compensation may be needed, so that the control logic 30 decides that the data line D1 needs to be driven in a way that stimulates the power converter circuit 43 to raise its output voltage (on the power line P). Several ways in which this can be achieved are described.

First, FIG. 2 illustrates the embodiment where the data line D1 is overdriven. That is, the dc voltage on the data line is actively raised, e.g. as a continuous, inverse function of the dc voltage at the input of the battery charging circuit 26. In the example circuit shown here, this is achieved by the control logic 30 commanding the switches S2, S3 to close, and S1 to switch to the data line D1. As the current draw on the power line P increases and the voltage at the input of the battery charging circuit 26 decreases (due to the voltage drop caused by the parasitic components illustrated as resistors and inductors, as well as the OVP/UVP switch circuit 27), this drop in the input voltage is sensed by the overdrive circuit 28. The latter may include an amplifier, which is able to sense the voltage at the input (when the switch S3 is closed). The amplifier may be designed to have a gain such that, when the switch S2 is closed, the data line D1 is overdriven, inversely proportional to the voltage at the battery charger circuit input. As explained below, this overdriving of the data line D1 is translated into a feedback input signal that emulates a lower output voltage for the voltage regulator in the EPS, resulting in the voltage on the power line P increasing so as to compensate (at least in part and in some cases fully) the voltage drop that would otherwise occur on the power line P, especially at an elevated current I.

Note that if the max available current as determined by the EPS identification decoder 24 is lower than a predetermined threshold, then the voltage drop in the communications interface may not be significant, such that the data line need not be driven (to stimulate the power converter circuit 43 of the EPS 18). This low current mode may be defined as switches S2, S3 both being open.

On the EPS-side, the data and power lines are available therein as part of the communications interface as shown. The power line is fed by the output port of the power converter circuit 43, which may include a voltage regulator function that regulates the dc voltage at the output port at a given specification (e.g., +5 volts dc for a typical USB specification). In most cases, the power converter 43 includes a switching voltage regulator that converts an ac or dc input voltage to the specified dc output, using a feedback input signal (fb_in) derived from its output. The feedback input signal is part of a feedback control loop of the regulator, which enables the regulator to maintain its output voltage at a steady level regardless of variations at the input ports and changes in the load at the output port.

To achieve voltage drop compensation, the EPS-side controller 15 changes the feedback input signal fb_in, responsive to the data line D1. In one embodiment of the invention, this is achieved using an analog multiplexer circuit composed of a switch S4 having an output that provides the feedback input signal, and at least two different scale circuits 44, 45 whose inputs are coupled to the output of the power converter 43 and the data line D1, respectively. Control logic 47 is provided, to receive a measure of the current I being sourced into the power line P. This measure of the current I is obtained using a current detect circuit 49. The control logic 47 has an output that is coupled to the control input of the analog multiplexer (control of the switch S4), to alternately select between the scale circuit 44 (local or power line sense point) and scale circuit 45 (remote or data line sense point). The scale circuits 44, 45 may be fixed at the time of the manufacture of the EPS-side controller 15, based on an understanding of the expected voltage change presented on the data line (at higher power line currents).

When the PD 10 is drawing in excess of a predetermined threshold amount of current I, the control logic 47 may decide that the analog multiplexer be switched from the power line sense point to the data line sense point. In other words, when current I is high, switch S4 is at the remote position (data line sense point), where the combination of the overdriven data line D1 and the amount of scaling applied by the scale circuit 45 result in the feedback input signal becoming smaller, thereby causing the closed loop voltage regulator function of the power converter 43 to respond by appropriately raising its output voltage. When current I is low, switch S4 is at the local position (power line sense point), where the scale circuit 44 governs how the feedback input signal is derived. Thus, the EPS-side controller 15 changes the feedback input signal of the power converter circuit 43, responsive to detecting that the current I is above a predetermined threshold, where the power converter circuit 43 in response raises its output voltage to compensate for the voltage drop in the communications interface with the PD 10.

It should be noted that the current detection circuit 49 may be implemented in several different ways. For example, a series sense resistor on the power line P to which are coupled associated analog and digitizing circuitry may be used to give a directed or sensed reading. In contrast, the current I could detected indirectly, e.g. estimated by monitoring the pulse with modulation duty cycle of the switching voltage regulator function of the power converter circuit 43 and then inferring the load current I using a previously determined look up table, in view of the voltage at the input ports of the power converter 43.

Figure 3:
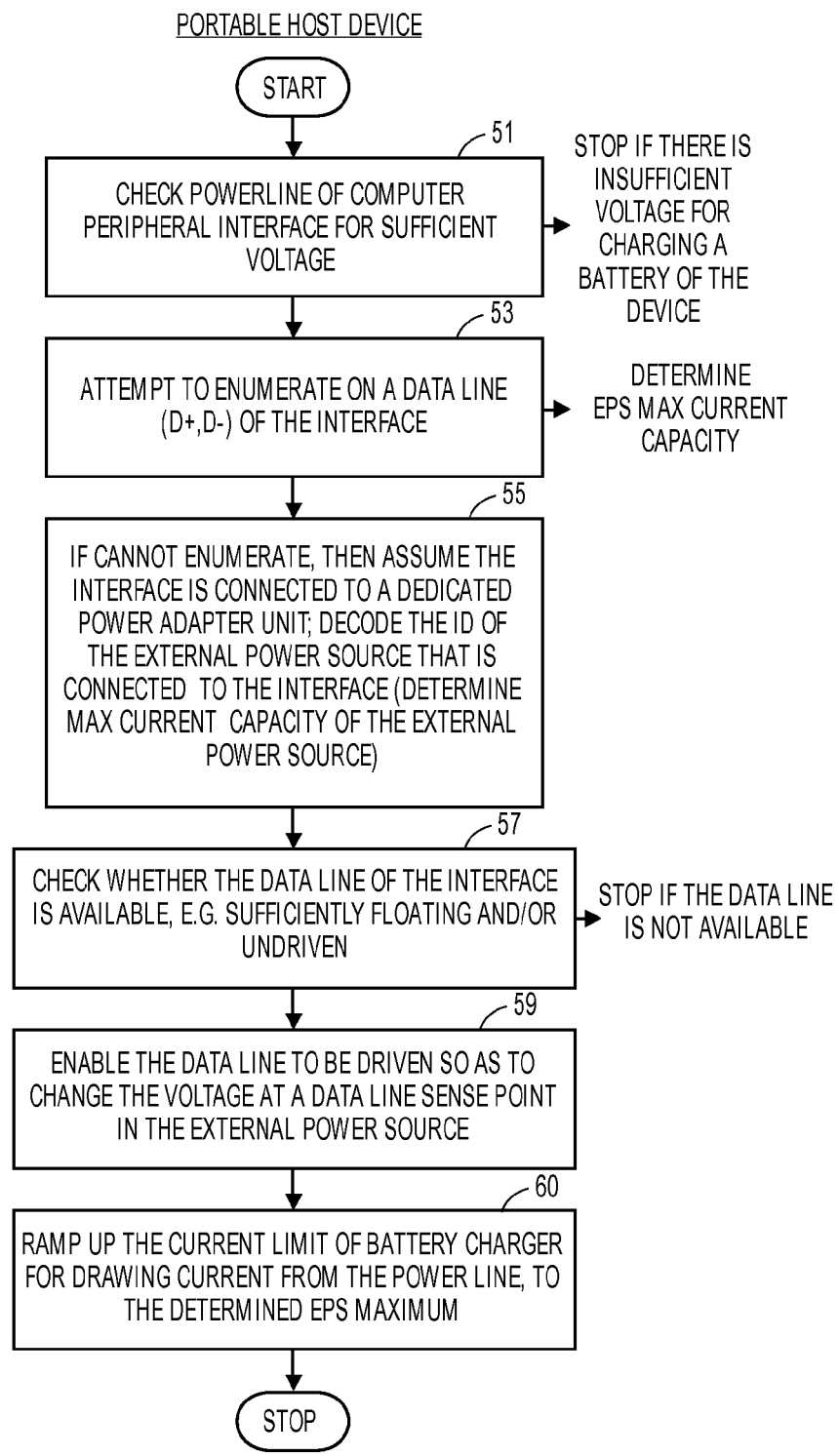
FIG. 3 is a flow diagram of operations that may be performed in the PD.

FIG. 3 is a flow diagram of an example process that may be performed in the PD to compensate for voltage drop in the communications interface through which the PD is coupled to an EPS, for purposes of charging the battery of the PD. Not all of the operations depicted in FIG. 3 are needed in all instances; furthermore, their sequence may be different. Also, the process in FIG. 3 is particularly suited to the above-described circuit schematic of FIG. 2, and especially where the EPS is a USB power adapter; however, the concepts are also applicable to other types of EPS and other types of communications interfaces.

One of the first operations to be performed in the process of FIG. 3 is to determine whether an EPS is coupled to the PD (through the communications interface). One way to do so is to check for sufficient voltage on the power line of a computer peripheral bus (operation 51), and then attempt to enumerate on the one or more data lines of the bus (operation 53). If the voltage is insufficient, then the process stops. If the enumeration succeeds, then the coupled EPS may be assumed to be a computing host whose current limit (max current capacity) is then determined. If the enumeration fails, then it may be assumed the EPS is a dedicated power adapter unit (e.g., a USB wall adapter, a USB cigarette lighter adapter), and its current limit is determined, by for instance decoding a signal on the data line (operation 55).

If the EPS has been identified as one that can source more than a predetermined amount of current through the power line of the interface, then a decision can be made to increase the current limit of the battery charging circuitry. If the predetermined amount of current is sufficiently great as to be expected to cause a significant voltage drop in the interface when operating at or above the predetermined amount of current (e.g., 1 Ampere), then voltage compensation will be needed on the power line. Therefore, the data line of the interface is checked to first ensure that it is not being driven or is sufficiently floating (operation 57). The process stops if the data line is not available—the data line cannot be driven to stimulate the EPS (to compensate for the expected voltage drop).

If the data line is available, then the compensation process can continue with enabling the data line to be driven so as to change the dc voltage (at the data line sense point in the EPS) and the voltage regulator feedback input signal in the EPS (operation 59). In other words, the dc voltage on the data line can now be forced to change, so as to cause the feedback input signal to change in a desired manner, e.g. continuously variable as a function of the dc voltage at the input of the battery charging circuit, or in one or more discrete steps. The current limit of the battery charger circuit can now be ramped up, drawing increasingly more current from the power line (up to the determined max current limit of the EPS).

Figure 4:
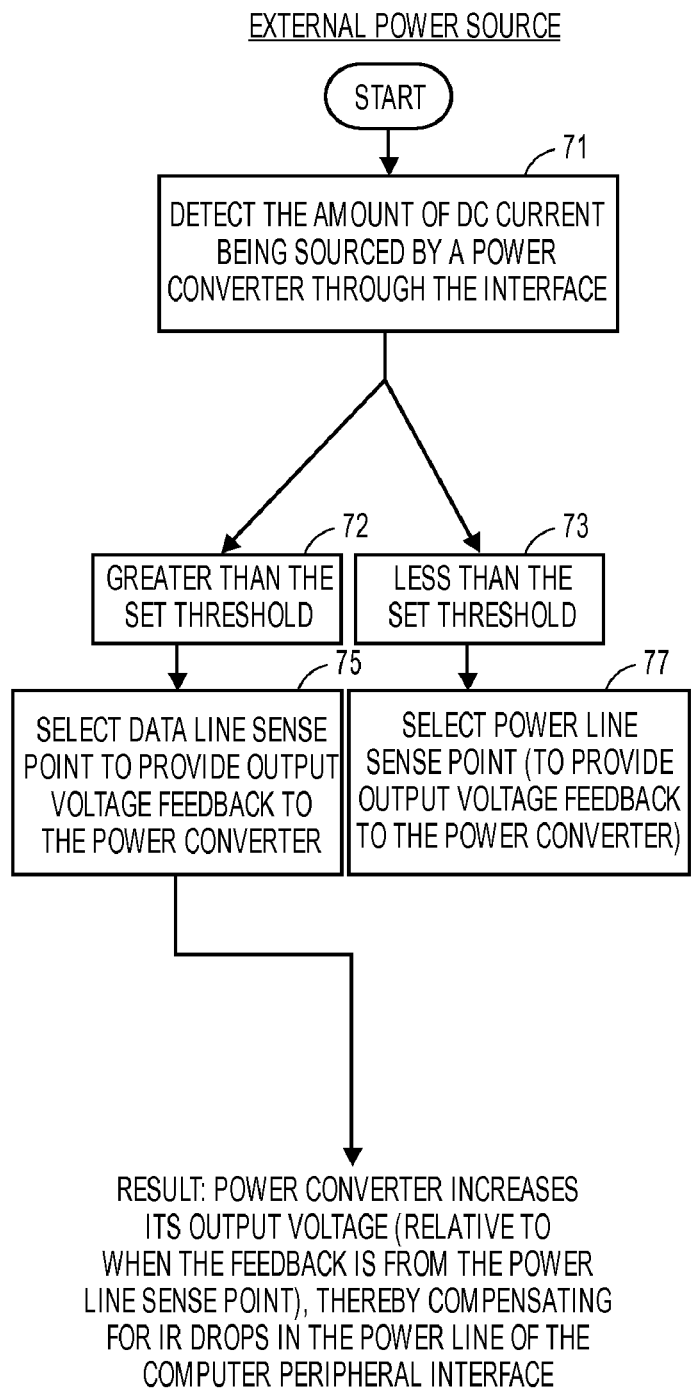
FIG. 4 is a flow diagram of operations that may be performed in the EPS.

To achieve voltage drop compensation, the PD-side process of FIG. 3 can be accompanied by an EPS-side process which is depicted in FIG. 4. In the EPS, the current I being sourced by the power converter through the power line (which is rising due to the battery charging circuit drawing more current) is monitored (operation 71). As explained above, this may be done using a direct sensing approach (e.g., a current sense resistor in series with the power line) or an indirect approach (e.g., measuring the pulse width modulation duty cycle of a switching voltage regulator and comparing to previously learned patterns and their associated current levels).

When the detected current is greater than a previously determined threshold (operation 72), the data line is selected to derive the feedback input signal for the voltage regulator (operation 75). When the detected current is less than the previously determined threshold (operation 73), the power line or power converter output is selected to derive the feedback input signal (operation 77). The result is that the feedback control loop of the power converter responds by increasing its output voltage (relative to when the feedback is from the power line sense point), thereby compensating in full or in part for the I*R drops in the power line.

Figure 5:
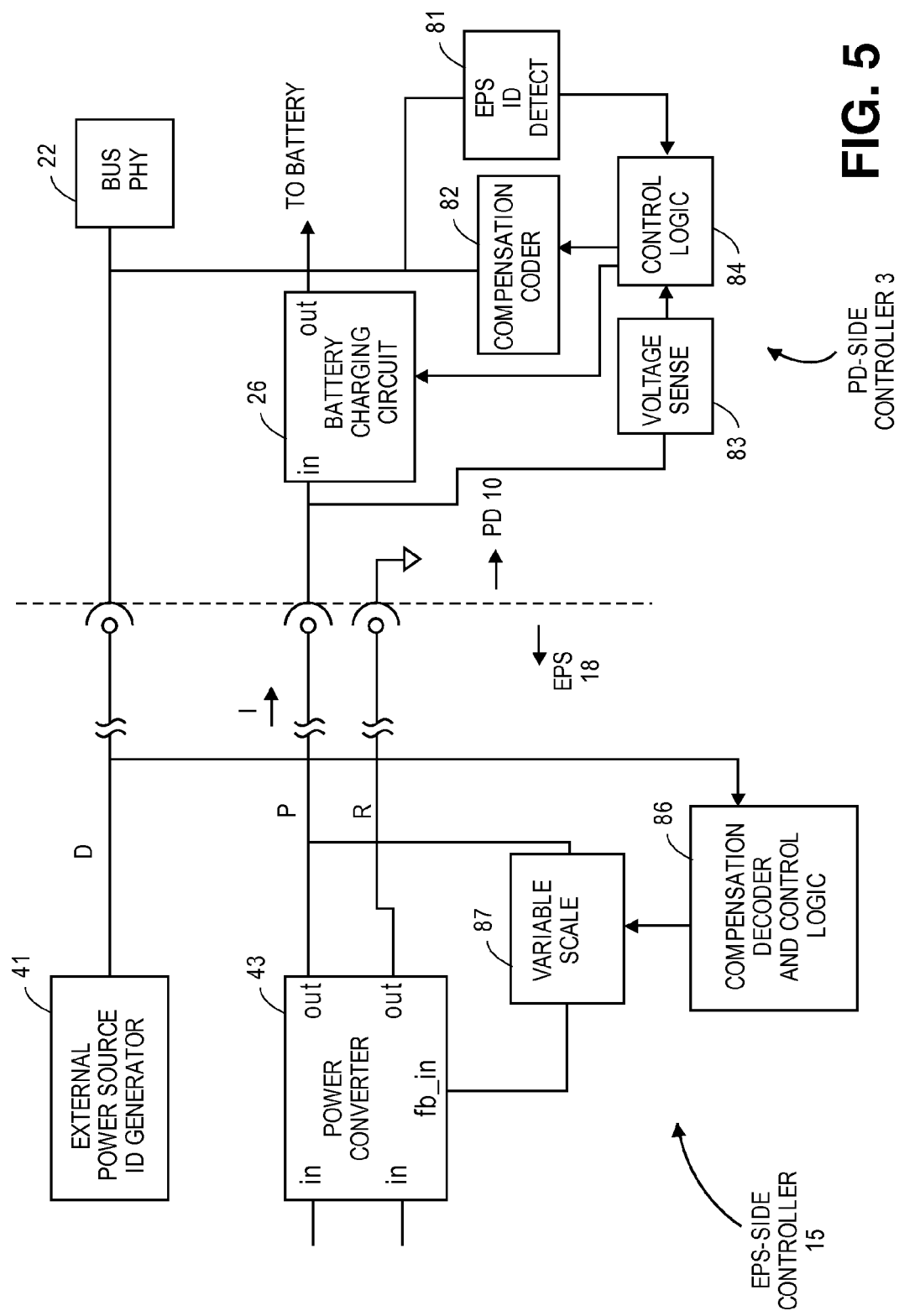
FIG. 5 is a circuit schematic of controller circuitry in the EPS and in the PD, in accordance with another embodiment of the invention.

Turning now to FIG. 5, another embodiment of the invention is shown where the PD-side controller 3 sends a coded command or control signal to the EPS-side over the data line D, for purposes of requesting and obtaining voltage drop compensation. This is in contrast to the embodiment of FIG. 3 and FIG. 4 where the controller 3 adjusts the dc voltage on the data line to merely reflect the fact that the voltage at the input of the battery charging circuit has dropped. The coded command is generated by a compensation coder 82 in response to a decision made by control logic 84. The latter is informed of the EPS' current limit by an EPS identification detect circuit 81 (which may be similar to the combination of the ADC 25 and EPS identification decoder 24 of FIG. 1). When the EPS has a higher current limit, the control logic 84 may decide to signal the EPS that voltage drop compensation is needed, by requesting the compensation coder 82 to drive the data line D with the appropriate command code. The control logic 84 may then signal the battery charging circuit 26 that it may now increase its input current, up to the EPS' current limit.

Note that there may be several predetermined, command codes from which one or more can be selected. The selection may be a function of a real-time measure of the dc voltage at the input of the battery charging circuit. A voltage sense circuit 83 may be used to sample and then digitize this input voltage, which is then processed by the control logic 84 to make the selection. For instance, several ranges can be defined for the input voltage, e.g. nominal, "low", and "very low", with their respective associated command codes that translate into corresponding changes to the feedback input signal of the voltage regulator in the EPS 18.

The command codes sent to the EPS 18 over the data line D are decoded by compensation decoder and control logic 86. The EPS-side controller 15 in this case has an analog signal conditioning circuit, e.g. a variable scale circuit 87, having a signal input coupled to the output of the power converter 43, an output to provide the feedback input signal, and a control input. Each code can represent a different type of conditioning (e.g., amount of scaling) that is to be applied to the sensed power line voltage, to derive the feedback input signal. For instance, the code for battery charging input voltage being "very low" (meaning that the current draw is particularly high) could translate into a greater attenuation of the sensed power line voltage than the "low" code; this would cause the power converter 43 to raise its output voltage more for the "very low" code than for the "low" code. As another example, when the code received from the PD 10 indicates that the current I is low (or the battery charger input voltage is within a nominal, specified range for the communications interface), then the variable scale circuit is signaled into a default setting; thereafter, when a subsequent code is received from the PD 10 indicating that the current I is now high (or the battery charger input voltage dropped below its nominal range), then the variable scale circuit 87 is signaled into a "plus" setting, i.e. a different scale factor is applied to the power lines sense point, to change the feedback input signal so as to emulate a condition where the power converter output is lower than it actually is. The latter will then cause the voltage regulator to raise its output in accordance with the changed feedback input signal, thereby compensating for the voltage drop through the interface.

Figure 6:
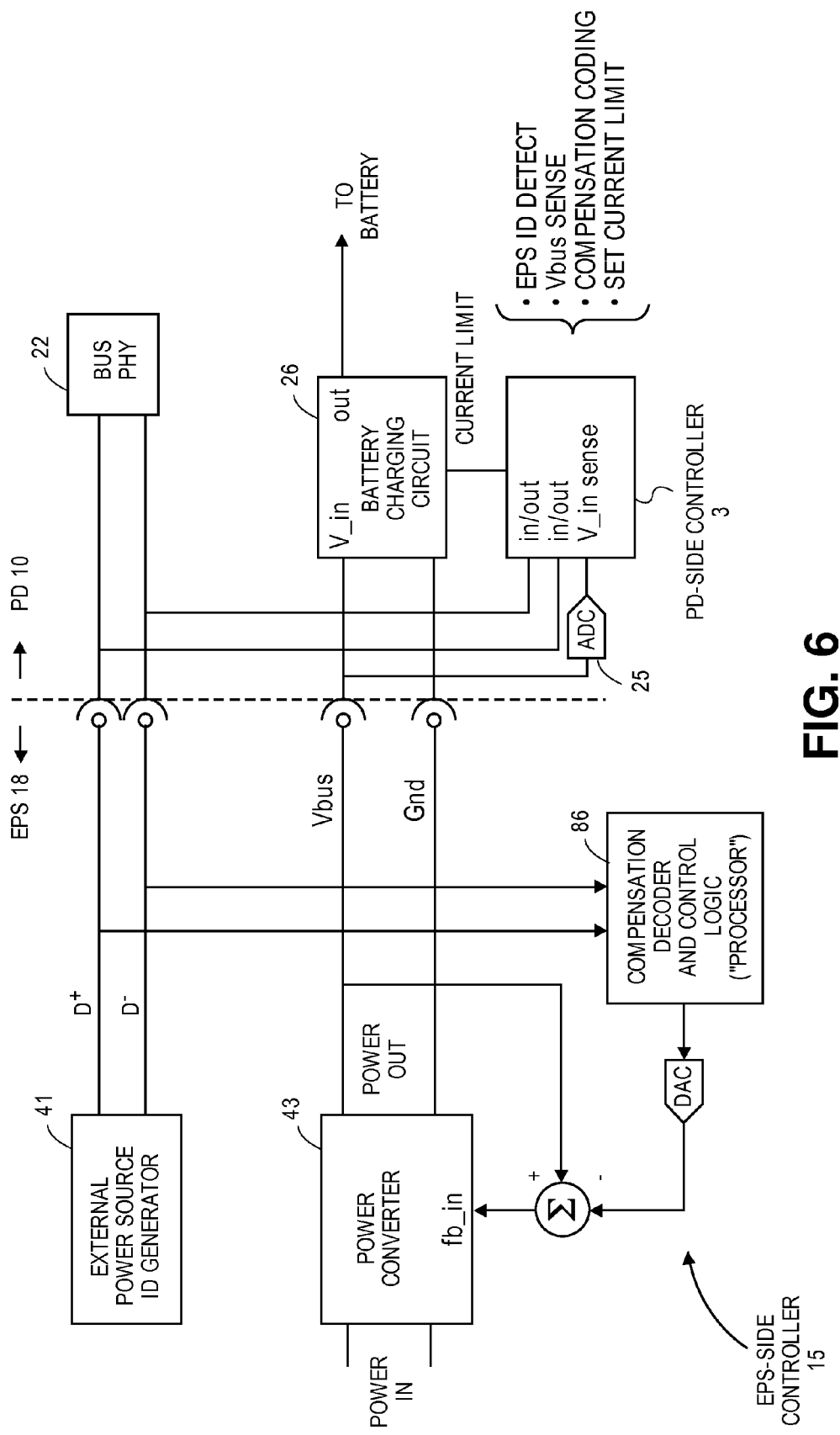
FIG. 6 is a circuit schematic of controller circuitry in the EPS and in the PD, in accordance with yet another embodiment of the invention.

FIG. 6 is a circuit schematic of controller circuitry in the EPS and in the PD, in accordance with yet another embodiment of the invention. Beginning with the PD side, the controller 3 has at least one, and in this case a pair, of I/O ports that are connected to the one or more data lines (in this case, D+, D− which are a differential signaling pair) of the communications bus. The controller 3 uses its I/O ports as input, to detect or identify the EPS 18 (e.g., as part of a bus enumeration process) and communicate with the EPS side processor 86. The controller 3 uses its I/O ports as output, to send command codes to the processor 86 in response to having determined that there may be a need to do so given the relatively high current draw expected or actually occurring on the Vbus line. The controller 3 also has an input which is used to sense or measure the voltage on the power line (Vbus) at the input of the battery charging circuit (as digitized by the ADC 25). The controller 3 may also set a current limit of the battery charging circuit 26 which draws current on the Vbus line, based on having detected the identification of the EPS 18 and, in particular, the output dc current capability of the EPS 18. These functions of the controller 3 may be performed and implemented for the most part as described above, for the other embodiments of the invention.

Still referring to FIG. 6, the controller 3, once it has determined that the EPS 18 is a "special" accessory device or adapter (or other type of power source that may have greater current capability than a default level), begins a communication session with the compensation decoder and control logic 86 (also referred to as processor 86) of the EPS 18. This is performed over the at least one data line D+. For instance, when a pair of data lines D+, D− are available, a two wire, bi-directional protocol such as I2C may be used. See I²C-bus specification and user manual, Rev. 03-19 Jun. 2007 (UM10204). Note that other serial bus protocols that are relatively low cost (because there is no need for high speed communications in this case) may be used. The controller 3 may have level shifters to impose and sense transitions on the otherwise pulled up D+, D− lines (pulled up on the EPS side, for instance), to encode data and clock information. These commands are interpreted or recognized by the processor 86 on the EPS side, as signaling that voltage drop compensation on the communications bus is needed. Note that in this case, the PD side controller 3 may be viewed as the master of the communications session on the data lines, while the processor 86 on the EPS side is considered the slave.

The PD side controller 3, as a master, signals a code on the data lines D+, D− that represents the voltage at the input of the battery charging circuit 26 that it has sensed or measured. This code is then recognized by the EPS side of compensation decoder and control logic 86, as also an indication that voltage drop compensation is needed for the Vbus and ground lines of the communications interface. The control logic 86 thus receives a measure of the dc voltage at the input of the battery charging circuit 26, and responds by generating an error or compensation value that is then converted to analog form by the digital to analog converter (DAC). A summing circuit provides the feedback input signal fb_in to the power converter, based on a combination of the output of the power converter and the compensation value generated by the control logic 86. For instance, if the specified output voltage on Vbus is known to the control logic 86 as being +5 Vdc, yet the code received from the PD side indicates that the input voltage of the battery charging circuit is substantially less, e.g. 4.9 Vdc, then the compensation value that is generated may represent the difference, namely 0.1 Vdc. This value would then be subtracted from the sensed voltage at the output of the power converter (in the EPS side) by the summing circuit, thereby providing a feedback input signal that has been adjusted downward; this causes the power converter to respond by boosting its output voltage appropriately or in proportion to the compensation value.

In addition to signaling the need for voltage drop compensation and the measured input voltage at the battery charging circuit, the communications interface and mainly the D+ and D− data lines may be used by the compensation processor 86 (control logic 86) to send information to the PD 10, by signaling at least one of the following attributes pertaining to the EPS 18: manufacturer name; date of manufacture; maximum output power capability; specified power line voltage; serial number; and authentication value. This information may be signaled using a different protocol than that used by a core circuit of the EPS 18 to perform core communications with the coupled PD 10. For instance, the EPS 18 may be a desktop computer that uses a USB protocol over the communications interface for its core communications with a coupled peripheral device, whereas the control logic 86 uses I2C to communicate with the PD side controller 3.

Figure 7:
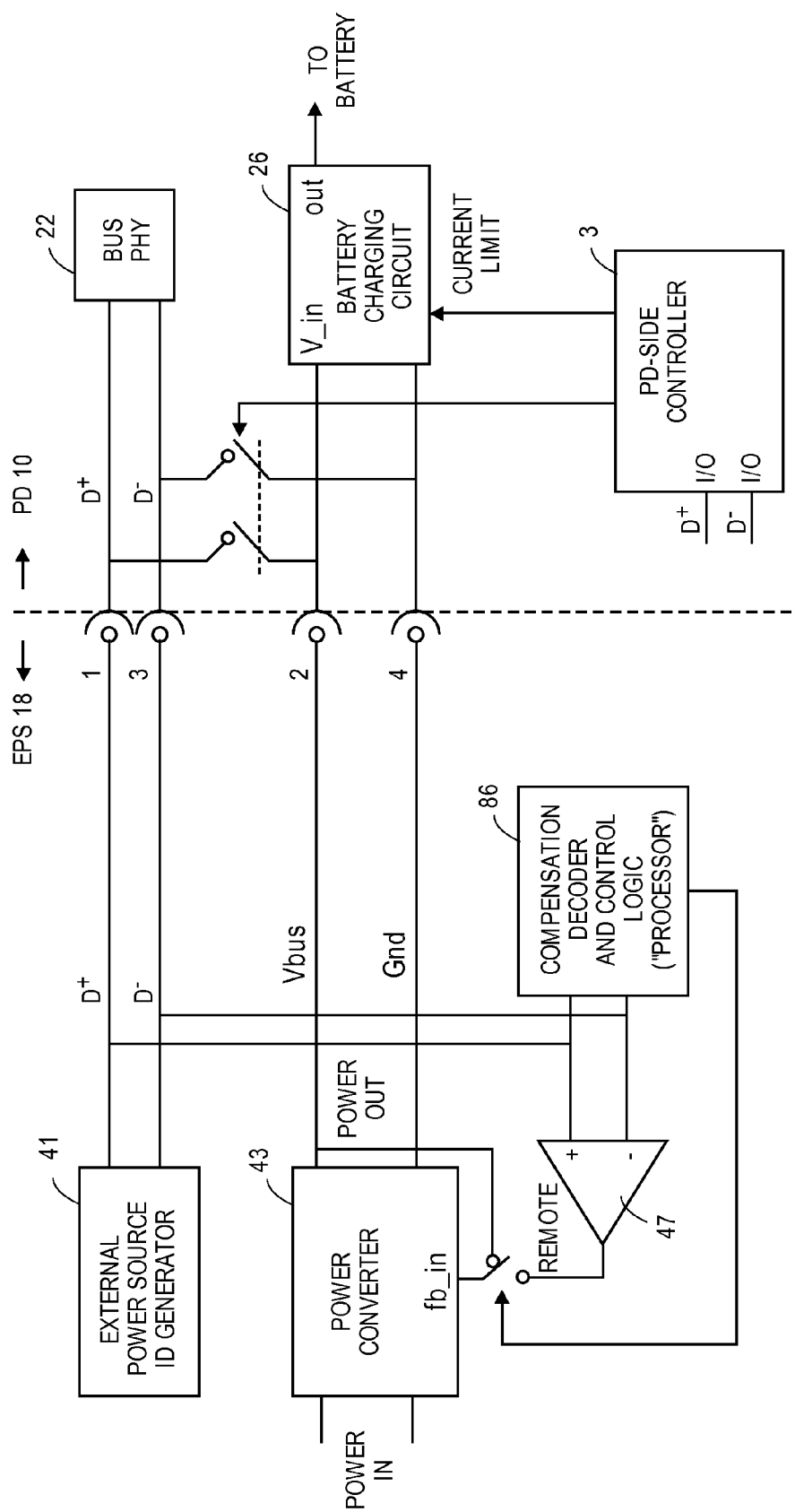
FIG. 7 is a circuit schematic of controller circuitry in the EPS and in the PD, in accordance with yet another embodiment of the invention.

FIG. 7 depicts yet another embodiment of the invention, where in this case the PD 10 has a pair of switches that are to be activated by the controller 3, to connect, or in this example short, the D+ and D− pins of the communications interface to the power and return pins (labeled here as Vbus and ground), respectively. The controller 3 after having determined that voltage drop compensation may be needed on the Vbus line (e.g., in response to, or just prior to, signaling a higher current limit to the battery charging circuit 26) will activate the pair of switches so that in effect a remote output sense circuit is created, for providing feedback to the voltage regulator in the power converter. This is achieved by using a difference amplifier 47 having its inputs coupled to the data lines D+, D−, respectively, and its output being one of two signals that are alternately provided to the feedback input of the power converter 43. The output of the difference amplifier 47 is considered to be the remote sense input, when the D+, D− lines have been connected to the Vbus and ground lines in the PD side.

A selector provides the desired selection between the remote and local feedback inputs, under control of the processor 86. In particular, in response to the processor 86 receiving an indication from the coupled PD 10 that there is a need for voltage drop compensation, the selector is signaled to switch from the local sense to the remote sense (this assumes that the D+, D− lines have been connected to the Vbus and ground lines in the PD side). As the remotely sense voltage is less than the locally sensed voltage (due to the voltage drop through the communications interface cable assembly), the output of the power converter 43 will be automatically boosted in proportion, thereby compensating for the voltage drop.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the PD 10 depicted in FIG. 1 is a smart phone, the invention is applicable to other types of PDs, e.g. laptop/notebook computers, dedicated navigation devices, digital media players, cellular phones, and personal digital assistants. The description is thus to be regarded as illustrative instead of limiting.

What is claimed is:

1. A portable electronic device comprising:
   a connector having a first pin and a second pin;
   a battery charging circuit having an input coupled to receive current through the second pin to charge a battery; and
   a controller to determine whether the connector is coupled to an external power source (EPS) having a power converter circuit that can provide said current, and on that basis drive the first pin to stimulate the power converter circuit to raise voltage on the second pin.

2. The portable device of claim 1 wherein the controller is to raise a current limit of the battery charging circuit, after starting to drive the first pin to stimulate the power converter circuit.

3. The portable device of claim 1 wherein the connector is a computer peripheral serial bus connector.

4. The portable device of claim 3 wherein the controller is to determine whether the connector is coupled to the EPS by checking for sufficient voltage on the second pin and by attempting to enumerate on the bus connector.

5. The portable device of claim 3 wherein the controller is to determine whether the connector is coupled to the EPS by checking for sufficient voltage on the second pin and by attempting and then failing to enumerate on the bus connector.

6. The portable device of claim 1 wherein the controller is to determine whether the connector is coupled to the EPS by decoding an indication on the first pin that indicates a current limit of the EPS.

7. The portable device of claim 1 wherein the controller is to drive the first pin by raising dc voltage of the first pin as an inverse function of dc voltage at the input of the battery charging circuit.

8. The portable device of claim 1 wherein the controller is to drive the first pin by signaling a predetermined code on the first pin.

9. The portable device of claim 8, wherein the code indicates that the battery charging circuit is drawing a higher current level.

10. The portable device of claim 1 wherein the controller is to measure dc voltage at the input of the battery charging circuit, and to drive the first pin by signaling a code that represents the measured dc voltage.

11. A portable electronic device comprising:
    a connector having a first pin, a second pin, a third pin, and a fourth pin;
    a first switch to connect the first pin and the second pin, when activated;
    a second switch to connect the third pin and the fourth pin, when activated;
    a battery charging circuit having an input coupled to receive current through the second pin to charge a battery, and return current through the fourth pin; and
    a controller to determine whether the connector is coupled to an external power source (EPS) having a power converter circuit that can provide said current, and on that basis activate the first and second switches to enable the power converter circuit to compensate for voltage drop on the second pin.

12. The portable device of claim 11 wherein the controller has a port coupled to one of the first and third pins, for determining output power capability of the EPS.

13. A method in a portable electronic device for charging a battery of the device, comprising:
    detecting that the portable electronic device is connected to an external power source (EPS) through a communications interface connector of the device, the connector having a data line and a power line;
    selecting a higher current limit, rather than a lower current limit, for drawing current from the power line to charge the battery; and
    driving the data line so as to stimulate the EPS to compensate for voltage drop on the power line, wherein dc voltage of the power line rises in response to the data line being driven.

14. The method of claim 13 wherein the detecting comprises:
sensing that the power line exhibits sufficient voltage; and
attempting to enumerate on the data line and then failing to enumerate.

15. The method of claim 13 further comprising:
identifying output current capability of the EPS through the data line,
and wherein the selecting a higher current limit is responsive to having identified the capability of the EPS.

16. The method of claim 15 further comprising:
determining that the data line is sufficiently floating or undriven, prior to the driving.

17. The method of claim 13 further comprising:
charging the battery using current drawn from the power line into an input node of a battery charging circuit; and
sensing a voltage at the input node, and
wherein the driving the power line includes overdriving the power line by an amount that is in relation to the sensed voltage.

18. The method of claim 13 further comprising:
charging the battery using current drawn from the power line into an input node of a battery charging circuit; and
sensing a voltage at the input node, and
wherein the driving the power line includes signaling a code that represents the sensed voltage.

19. An electronic device, comprising:
a communications interface to be coupled to a portable device, the interface having a data line and a power line;
a power converter circuit having an output coupled to the power line to provide current to the coupled portable device for charging a battery of the portable device;
an analog multiplexer circuit having a first signal input coupled to the data line and a second signal input coupled to the output of the power converter, an output to provide a feedback input signal as derived from one of the first and second signal inputs, and a control input; and
control circuitry having an input to receive a measure of said current, and an output coupled to the control input to select between the first and second signal inputs in response to the measure of said current.

20. The electronic device of claim 19 wherein the communications interface comprises:
a connector through which the data and power lines pass, to receive a mating and detachable connector that is at an end of a cable.

21. The electronic device of claim 19 further comprising:
a current detector to determine when the measure of said current is above a predetermined threshold.

22. The electronic device of claim 21 further comprising:
an indicator circuit coupled to the data line to indicate that the power converter can provide said current above the predetermined threshold.

23. An electronic device, comprising:
a communications interface to be coupled to a portable device, the interface having a data line and a power line;
a power converter circuit having an output coupled to the power line to provide current to the coupled portable device for charging a battery of the portable device;
a signal conditioning circuit having a signal input coupled to the output of the power converter, an output to provide a feedback input signal, and a control input; and
control circuitry having an input coupled to the data line to receive a control signal, and an output coupled to the control input to adjust the feedback input signal in response to the control signal.

24. The electronic device of claim 23 wherein the communications interface comprises:
a connector through which the data and power lines pass, to receive a mating and detachable connector that is at an end of a cable.

25. The electronic device of claim 23 further comprising:
an indicator circuit coupled to the data line to indicate that the power converter can provide said current above a predetermined threshold.

26. An electronic device, comprising:
a communications interface to be coupled to a portable device, the interface having a data line and a power line;
a power converter circuit having an output coupled to the power line to provide current to the coupled portable device for charging a battery of the portable device, the power converter to receive a feedback input signal;
a signal conditioning circuit having a first input, a second input, and an output to provide the feedback input signal based on the first and second inputs, the first input being coupled to the output of the power converter; and
a compensation processor having an input coupled to the data line to receive a code that represents a measure of a battery charging circuit's input voltage, the processor to generate a compensation signal at the second input of the signal conditioning circuit to adjust the feedback input signal in response to the received code.

27. The electronic device of claim 26 wherein the communications interface supports (1) a first communications protocol for use by a core circuit of the electronic device to perform core communications with the coupled portable device, and (2) a second, different communications protocol for use by the compensation processor to perform voltage drop compensation.

28. The electronic device of claim 27 wherein the compensation processor is to use the second communications protocol to signal at least one of the following, pertaining to the electronic device: manufacturer, date of manufacture, maximum output power capability, specified power line voltage, serial number, and authentication value.

29. An electronic device, comprising:
a communications interface to be coupled to a portable device, the interface having first and second data lines and a power line;
a power converter circuit having an output coupled to the power line to provide current to the coupled portable device for charging a battery of the portable device, the power converter to receive a feedback input signal;
a difference amplifier having a first input coupled to the first data line and a second input coupled to the second data line;
a selector having a first input, a second input, and an output to provide the feedback input signal based on the first and second inputs alternately, the first input being coupled to the output of the power converter, the second input being coupled to an output of the difference amplifier; and
decoder and control logic having an input coupled to one of the first and second data lines to receive an indication from the coupled portable device that there is a need for voltage drop compensation, and in response signal the selector to switch from its first input to its second input.

30. The electronic device of claim 29 wherein the first and second data lines are for differential signaling.

31. A method in an electronic device for supplying current to an external portable device, comprising:
indicating, through a data line of a communications interface that is coupled to the external portable device, that a predetermined amount of current can be sourced through a power line of the interface;

detecting that at least the predetermined amount of current is being sourced from a power converter circuit in the electronic device through the power line;

deriving a feedback input signal to the power converter circuit from the data line, when at least the predetermined amount of current is being sourced from the power converter circuit; and deriving the feedback input signal from the power line, when less than the predetermined amount of current is being sourced from the power converter circuit.

32. The method of claim 31 further comprising:

indicating through the data line that the electronic device is of a type that can compensate for power line voltage drop in the communications interface.

33. A method in an electronic device for supplying current to an external portable device, comprising:

indicating, through a data line of a communications interface that is coupled to the portable device, that a predetermined amount of current can be sourced through a power line of the interface;

applying an analog scaling parameter to an output of a power converter circuit to derive a feedback input signal for the power converter circuit;

decoding a control signal received through the data line from the portable device; and adjusting the analog scaling parameter based on the decoded control signal.

34. The method of claim 33 further comprising:

indicating through the data line that the electronic device is of a type that can compensate for power line voltage drop in the communications interface.

* * * * *